United States Patent [19]
Fricke et al.

[11] Patent Number: 5,610,330
[45] Date of Patent: Mar. 11, 1997

[54] EFFECTIVE ROAD PROFILE CONTROL METHOD FOR A SPINDLE-COUPLED ROAD SIMULATOR

[75] Inventors: David M. Fricke, Howell; Mark D. Hansen; Rakan C. Chabaan, both of Farmington Hills, all of Mich.

[73] Assignee: Ford Motor Company, Dearborn, Mich.

[21] Appl. No.: 586,449

[22] Filed: Jan. 16, 1996

[51] Int. Cl.⁶ .......................... G01M 17/007; G01M 7/06
[52] U.S. Cl. ............................ 73/146; 73/865.6; 73/669
[58] Field of Search .................... 73/146, 8, 862.043, 73/865.6, 660, 669, 670

[56] References Cited

U.S. PATENT DOCUMENTS

| | | |
|---|---|---|
| 3,375,714 | 4/1968 | Bottasso . |
| 3,459,037 | 8/1969 | Holzman ................................ 73/669 |
| 3,520,180 | 7/1970 | Polhemus et al. ..................... 73/146 |
| 3,713,330 | 1/1973 | Lentz . |
| 3,718,033 | 2/1973 | Petersen . |
| 4,458,526 | 7/1984 | Doi et al. . |
| 4,981,034 | 1/1991 | Haeg . |
| 5,003,819 | 4/1991 | Koopmann . |
| 5,065,618 | 11/1991 | Hodges, Sr. et al. . |
| 5,259,246 | 11/1993 | Stuyts . |
| 5,465,615 | 11/1995 | Petersen et al. ..................... 73/669 X |

OTHER PUBLICATIONS

"A Technique for Measuring 'Effective' Road Profiles" (Allan P. Whittemore) SAE Paper 720094.
"Making A Road Simulator Simulate" (Ronald A. Cripe) SAE Paper 720095.

Primary Examiner—Richard Chilcot
Assistant Examiner—Joseph L. Felber
Attorney, Agent, or Firm—David B. Kelley

[57] ABSTRACT

A method for testing an automotive vehicle on a vehicle spindle-coupled simulator comprises the steps of driving a first vehicle over a test road surface, collecting spindle dynamics data from at least one spindle of said first vehicle, developing a first tire model for the first vehicle, estimating a road profile for the road surface based upon the spindle dynamics data and the first tire model, developing a second tire model for a second vehicle, coupling the second vehicle to the spindle-coupled simulator, and generating a set of control signals for driving the spindle-coupled simulator with the second vehicle coupled thereto so that a road response generated by the spindle-coupled simulator is consistent with the road profile. The method allows accurate testing of the second vehicle without driving it over the test road. The tire model is developed using system identification techniques.

19 Claims, 11 Drawing Sheets

EFFECTIVE ROAD PROFILE CONTROL METHOD FOR A SPINDLE-COUPLED ROAD SIMULATOR

FIELD OF THE INVENTION

The present invention relates to vehicle road simulators in general, and more specifically to spindle-coupled road simulators.

BACKGROUND OF THE INVENTION

Figure 1:
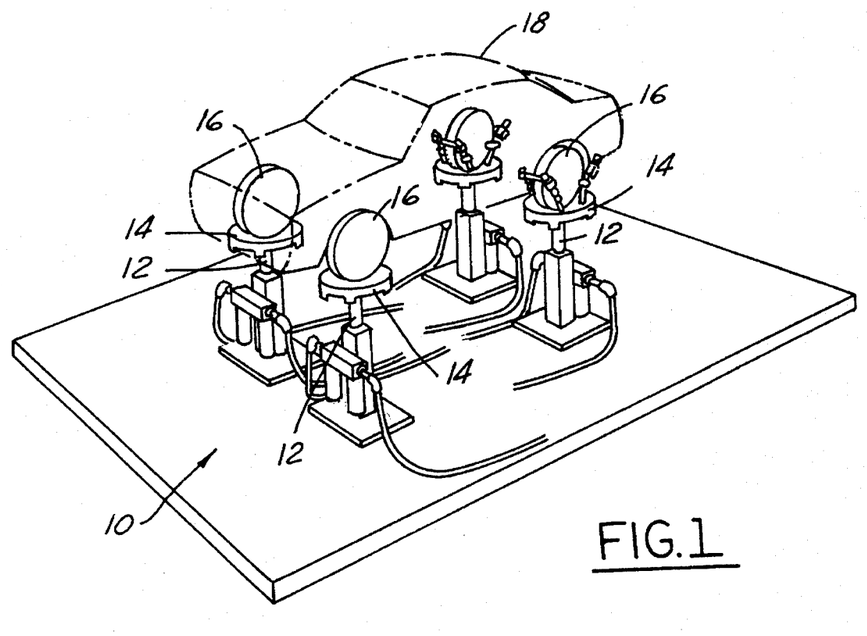
FIG. 1 is a perspective view of a tire-coupled four poster vehicle simulator.
Figure 2:
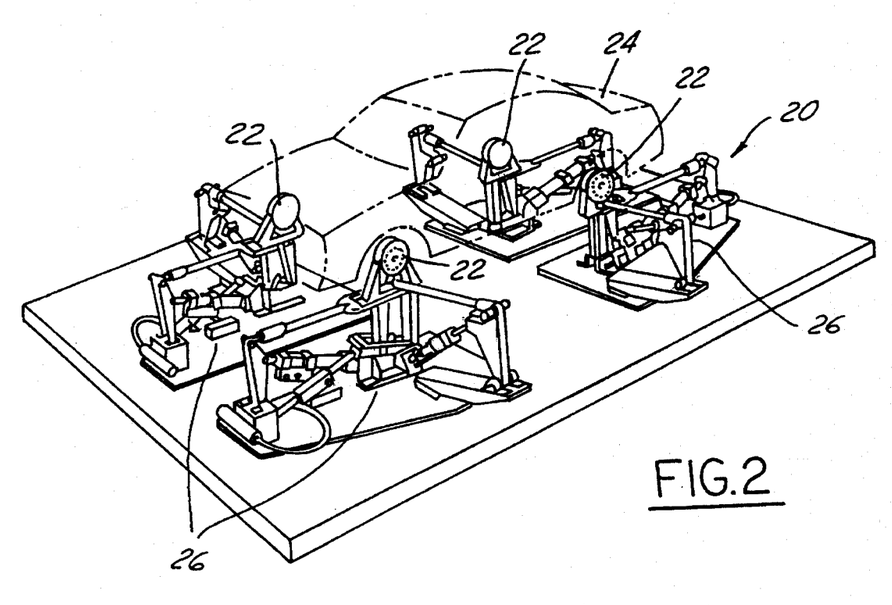
FIG. 2 is a perspective view of a spindle-coupled vehicle simulator.

Vehicle road simulation has been an effective development and validation tool within the ground-vehicle industry for many years. Full-vehicle road simulation facilities generally fall into two primary configurations: tire-coupled simulators, known as 4-Posters (FIG. 1), and spindle-coupled simulators (FIG. 2). As seen in FIG. 1, a 4-Poster tire-coupled simulator 10 has four posts 12 each with a platform 14 onto which a tire 16 of a vehicle 18 is attached. The 4-Poster has traditionally been used for body and body-component structural durability testing, evaluation of vehicle squeak and rattle characteristics, and performance testing of suspension control systems, as described in "Road Simulators in Car Body Structural Testing", F. Massaglia and E. Rossetto, Intl. Seminar on Techniques for Testing Vehicles and Related Structural Components, Torino Italy, 1984. Use of 4-Posters for suspension development and validation is limited, however, due to the lack of significant loading in the longitudinal, lateral, and brake moment axes.

A spindle-coupled simulator 20 (FIG. 2), on the other hand, can introduce from three to five forces and moments at each vehicle spindle 22. The tires of a vehicle 24 to be tested are removed and simulator controlled apparatus 26 is connected at each spindle 22. These simulators, although more expensive and complicated to operate, comprehensively test the complete vehicle for structural durability, except for internal powertrain components ("Three Years of Experience with the Audi Simulator", J. Petersen, Intl. Seminar on Techniques for Testing Vehicles and Related Structural Components, Torino Italy, 1984).

Figure 3A:
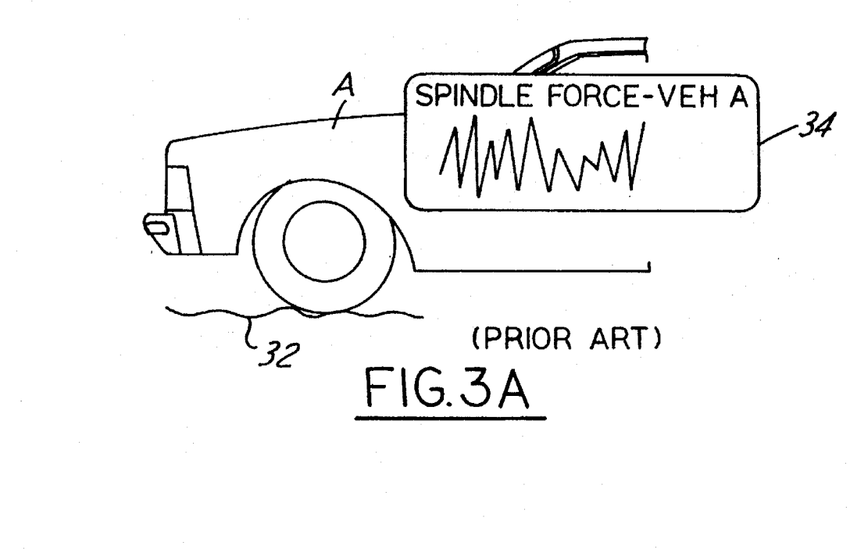
FIG. 3A shows a road traveling over a test road producing a spindle force history which is graphically shown.
Figure 4:
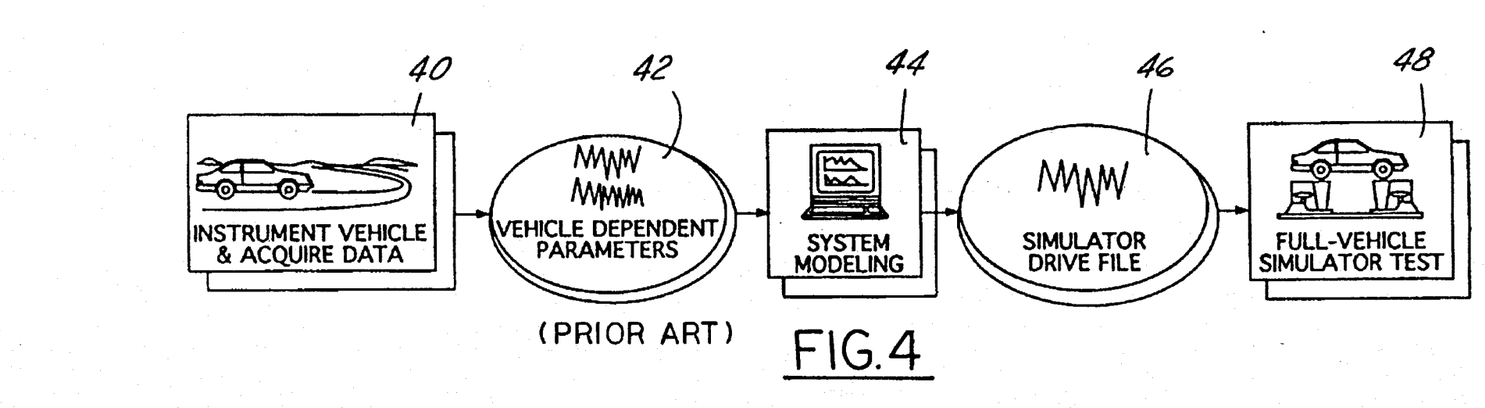
FIG. 4 schematically shows a prior process for testing vehicles on a spindle-coupled simulator by acquiring test data for each vehicle.

Industry-standard techniques for the control of road simulators, such as a spindle-coupled simulator, have been widely documented ("Road Simulation System for Heavy Duty Vehicles", Cryer et al., SAE Paper 760361, 1976). These techniques normally rely on the principle of "response simulation". In general, response simulation is an approach which uses experimentally determined models of simulator and vehicle dynamics to predict test control signals which force a desired vehicle response. These test control signals, which typically represent suspension component forces, accelerations, and wheel-to-body displacements, are determined from experimental responses gathered during a test run of an instrumented vehicle over a road, typically at a proving ground facility. As seen in FIG. 3A, a vehicle A having a certain configuration is driven over a road surface 32. Data is collected which can be reduced to a spindle force history 34, or the spindle force history 34 can be collected directly from the spindle. The procedure is shown in FIG. 4. In box 40, the vehicle is instrumented, driven over the road, and data is collected. In ellipse 42, vehicle dependent parameters, such as suspension component force or acceleration, are determined. These parameters are fed into a model of the simulator and vehicle dynamics in box 44 which produces a set of test control signals, referred to as a simulator "drive file" in ellipse 46. These test control signals are then capable of forcing the spindle-coupled simulator 48 to produce spindle-forces representative of those that were experienced when the vehicle was driven over the proving grounds road. The vehicle can then be further tested more efficiently on the spindle-coupled simulator.

Figure 3B:
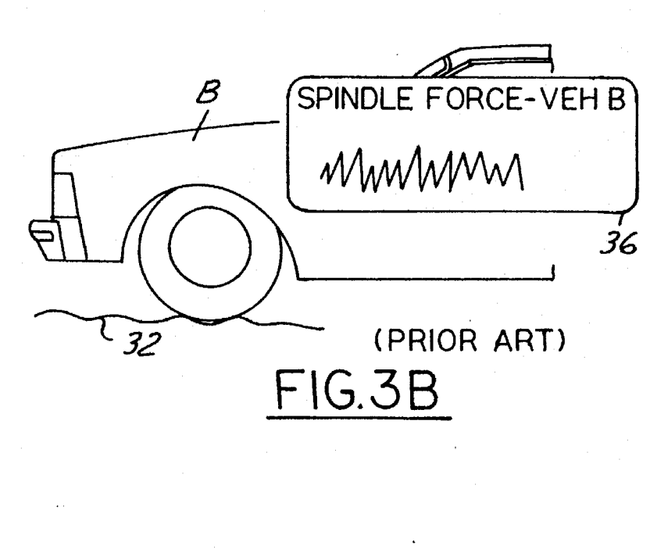
FIG. 3B shows a road traveling over a test road producing a spindle force history which is different than that shown in FIG. 3A.

For a vehicle having a different configuration, such as vehicle B in FIG. 3B, driven over the road surface 32, a different spindle force history 36 will be collected due to dynamics changes resulting from configuration differences between vehicles A and B. The process in FIG. 4 is therefore required to be run again and a separate simulator drive file developed for vehicle B to achieve further accurate testing. The vehicle instrumentation and data acquisition phase required to obtain the develop the simulator drive files for each vehicle can take from 6 to 8 weeks. Once the experimental responses have been gathered for a particular vehicle, further testing can be accomplished on a spindle-coupled road simulator through response simulation using the test control signals as input.

Figure 5:
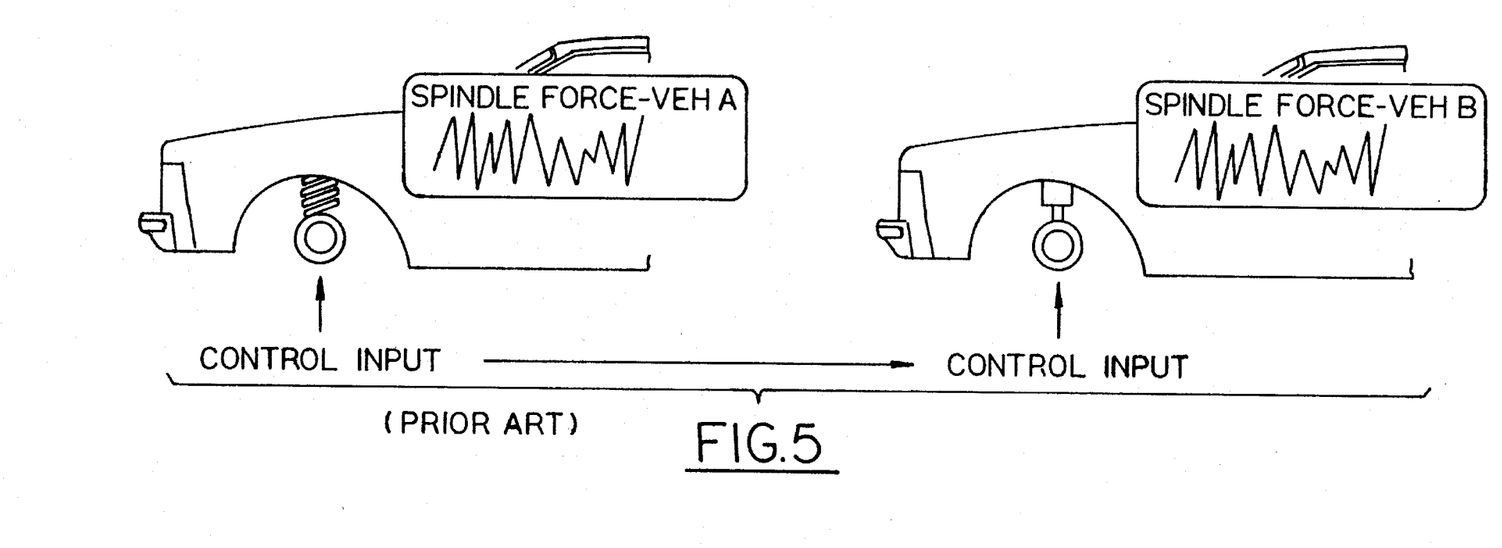
FIG. 5 shows use of the same control spindle force input for differently configured vehicles according to a prior spindle-coupled simulation control process.
Figure 6:
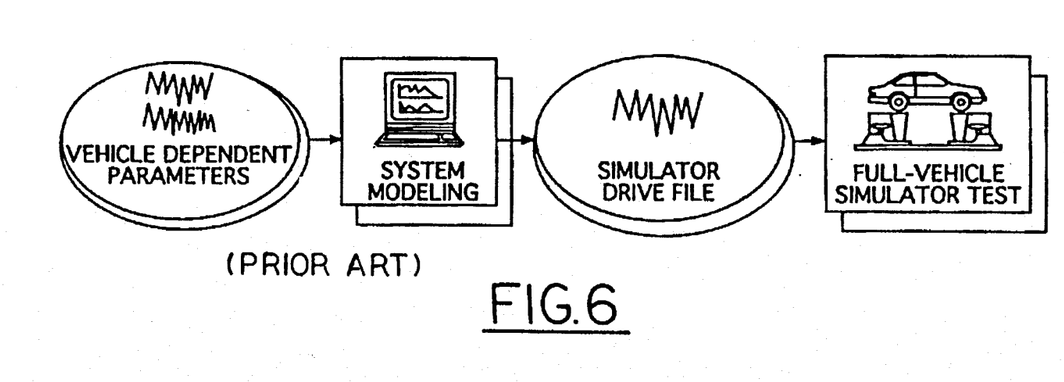
FIG. 6 is a schematic diagram of the process of FIG. 5.

One alternative is to use the spindle force history of vehicle A as an input to vehicle B, as shown in FIG. 5. Essentially, the test control signals on the drive file for vehicle A would be used for testing vehicle B. The data acquisition phase for vehicle B would thus be eliminated (FIG. 6), thus reducing vehicle development time and cost. It has been found, however, that using the test control signals developed for one vehicle configuration does not provide a good approximation of actual road conditions for other vehicle configurations when attempting to simulate road conditions on a spindle-coupled simulator. This is so since vehicle configuration changes such as suspension level, suspension-to-body clearance, and vehicle ballast have a significant impact on the dynamics of the spindle, particularly due to the absence of tires in a spindle-coupled simulator.

Prior methods for mechanically re-introducing tire compliance into the spindle-coupled simulation process have been only partially successful. One such method, disclosed in U.S. Pat. No. 4,981,034 (Haeg), involved adding an adjustable gas-spring to a simulator vertical fixture, which could be tuned to approximate the dynamics of a physical tire. Another incorporated the vehicle tire into the simulator using a platform and strap restraint. Both of these solutions required expensive, major modifications to the simulation equipment, and had associated limitations. For example, the tire-spring emulator offered only vertical compensation, and the tire/strap configuration over-constrained the suspension in the vertical rebound direction. In addition to mechanical modification of the spindle-coupled simulator, modification of the simulator servo-hydraulic control system to simulate a tire has also been attempted. Initial attempts to incorporate a "tire" into the closed-loop controller using simple proportional-derivative force feedback failed to provide any significant dynamic tire compliance.

As a result of this lack of an acceptable method for emulating the tire dynamics for a spindle-coupled simulator, the traditional approach has been to record experimental responses for each vehicle configuration to be tested, install each such vehicle on the simulator, and re-develop test control signals that are specific for each vehicle configuration, as described above with respect to FIGS. 3A, 3B and 4. This approach significantly slows vehicle development due to the time required to instrument the vehicle and collect the data for each configuration, particularly for vehicles which have many combinations of structural attributes, such as body-styles, suspensions, and wheelbases. A process which provides "generic" test control signals For spindle-coupled simulators regardless of vehicle configuration is therefor needed to reduce vehicle development time.

SUMMARY OF THE INVENTION

Responsive to the deficiencies in the related art, the present invention provides a method for developing generic test control signals for a spindle-coupled simulator. The test control signals can be used for testing a sample vehicle on an automotive vehicle spindle-coupled simulator without driving the sample vehicle over a test road. The test vehicle is driven over a test road surface and test road response parameters are measured. The test vehicle is then coupled to a spindle-coupled simulator and a set of test control signals are generated so that a set of simulator road response parameters out from the spindle-coupled simulator matches, and is consistent with, the test road response parameters. A tire model is developed for the test vehicle, and an effective road file for the test road surface is estimated based upon the test control signals and an inverse of the test vehicle tire model. A second tire model is also developed for the sample vehicle. The sample vehicle is then coupled to the spindle-coupled simulator and a set of sample control signals are generated for driving the spindle-coupled simulator so that a road response generated by the spindle-coupled simulator matches the effective road profile. The generated sample control signals can subsequently be used for further testing the sample vehicle without having to physically drive the sample vehicle over the test road, thus eliminating the time needed to instrument the vehicle and drive it over the test road. Sample control signals for other vehicles may also be developed based upon the estimated effective road profile without driving the vehicles over the test road.

The test control signals are generated in a feedback loop which has a response simulation transfer function which includes a model of the test vehicle, and the spindle response parameters are used with an inverse of the test tire model to estimate the effective road profile. The set of control signals for the sample vehicle are generated in a feedback loop which includes a response simulation transfer function having an inverse of the tire model for the sample vehicle.

In a preferred embodiment, spindle dynamics data may be obtained directly from a test vehicle when driven over the test road thereby eliminating the need to couple the test vehicle to the spindle-coupled simulator. The tire models are preferably developed using system identification techniques directly from predicted physical principles, the model necessarily being invertible.

Preferably, the system identification technique includes a coordinate system for the road profile which is defined as a flat tire contact plane which varies in radial displacement, radial contact angle, and lateral contact angle of the tire with respect thereto. A programmable tire test stand is used to develop a set of dynamically varying data for input to the system identification technique including the aforementioned parameters.

Thus, an advantage of the present invention is a method for testing a sample vehicle on an automotive vehicle spindle-coupled simulator which reduces the test development time for a vehicle by a significant time.

Another advantage is a method for testing a sample vehicle on an automotive vehicle spindle-coupled simulator which eliminates the need for an additional prototype for the instrumentation and road data acquisition phases of a traditional test development process.

Yet another advantage is a vehicle spindle-coupled simulation process which uses an effective road profile developed by use of a test vehicle traveling over a test road for testing of subsequent vehicles on the spindle-coupled simulator without the need for road testing.

Still another advantage of the present invention is a spindle-coupled simulation process which incorporates a model of a vehicle tire.

A feature of the present invention is a vehicle tire model developed using a system identification technique which includes a coordinate system for a road profile defined as a flat tire contact plane which varies in radial displacement, radial contact angle, and lateral contact angle.

Another feature is a programmable tire test stand with at least three degrees of freedom which is used to develop a set of dynamically varied data for a vehicle tire, including radial deflection, radial contact angle, and lateral contact angle with respect to a pre-defined coordinate system, the data input to a system identification technique for modeling the tire.

BRIEF DESCRIPTION OF THE DRAWINGS

These and other objects, advantages, and features of the present invention will be apparent to those skilled in the vehicle testing arts upon reading the following description with reference to the accompanying drawings, in which.

DETAILED DESCRIPTION OF THE PREFERRED EMBODIMENTS

Figure 7:
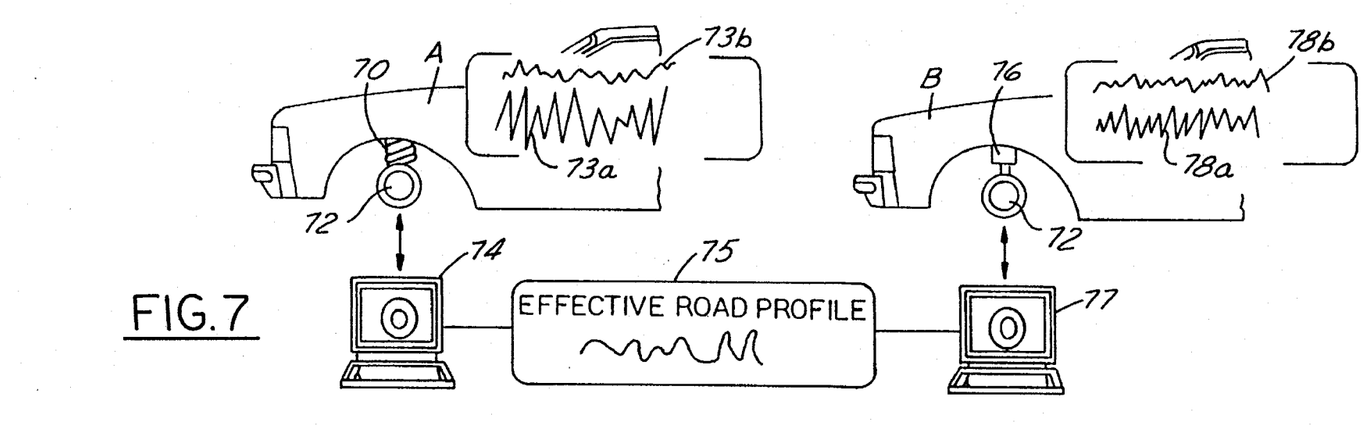
FIG. 7 shows an effective road profile according to the present invention for use in combination with a tire model to eliminate sample road testing of a vehicle to be tested on a spindle-coupled simulator.

Referring now to the drawings and in particular to FIG. 7 thereof, a vehicle A has a suspension configuration which includes a spring 70 above a spindle 72. A spindle force history 73a and spindle acceleration history 73b are generated when vehicle A is driven over a test road, such as is typically available at a vehicle proving grounds. The spindle force and acceleration histories 73a, 73b are used in conjunction with a model 74 of a tire attached to vehicle A when driven over the test road to develop an effective road profile 75. For purposes of this disclosure, an effective road profile is a set of signals which, in conjunction with a tire model, and when used as a feedback parameter in a standard response simulation test process provides accurate excitation of the spindle-coupled simulator to simulate a test road. A vehicle B, having a different configuration, for example an air suspension 76, can be accurately tested without the need for driving the vehicle B over a test road. That test is accomplished by using the effective road profile 75 and a second tire model 77, which represents a tire used on the vehicle B, to generate spindle force and acceleration histories 78a and 78b, respectively, which would be developed had vehicle B been driven over the test road with a tire model 77. Thus, only one vehicle configuration need be driven over a test road to obtain the data necessary to develop an effective road profile which can subsequently be used for testing other vehicle configurations.

Figure 8:
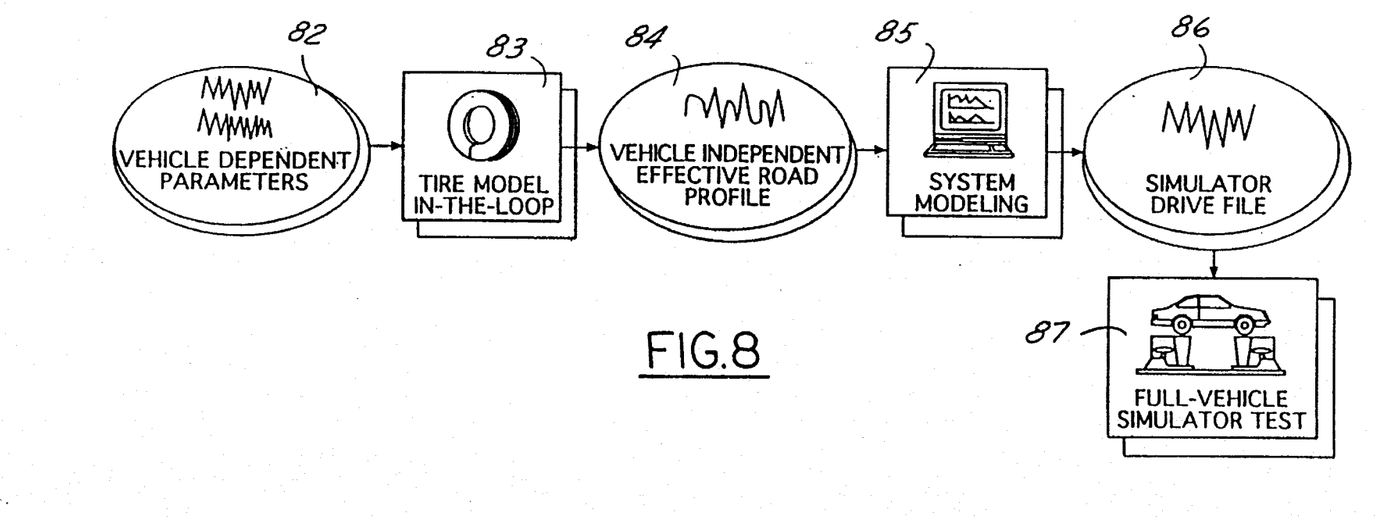
FIG. 8 is a schematic flow diagram of the effective road profile control method according to the present invention for use with a spindle-coupled road simulator.

A schematic flow diagram of the just described process is seen in FIG. 8. In ellipse 82, vehicle dependent parameters, such as spindle force and spindle acceleration, are obtained for a first, or test, vehicle when driven over a test road. The vehicle dependent parameters are then used in conjunction with a tire model 83 to yield a vehicle independent effective road profile 84. Since the effective road profile is independent, that is, it is representative of the actual test road without regard to vehicle configuration or tire model, it may be used with a model of a spindle-coupled simulator 85 in a feedback control process to develop a simulator drive file 86 which can be used as an input to a spindle-coupled simulator 87 with a second vehicle coupled thereto. It is important to note that the second vehicle need not have been driven over the test road.

Figure 9:
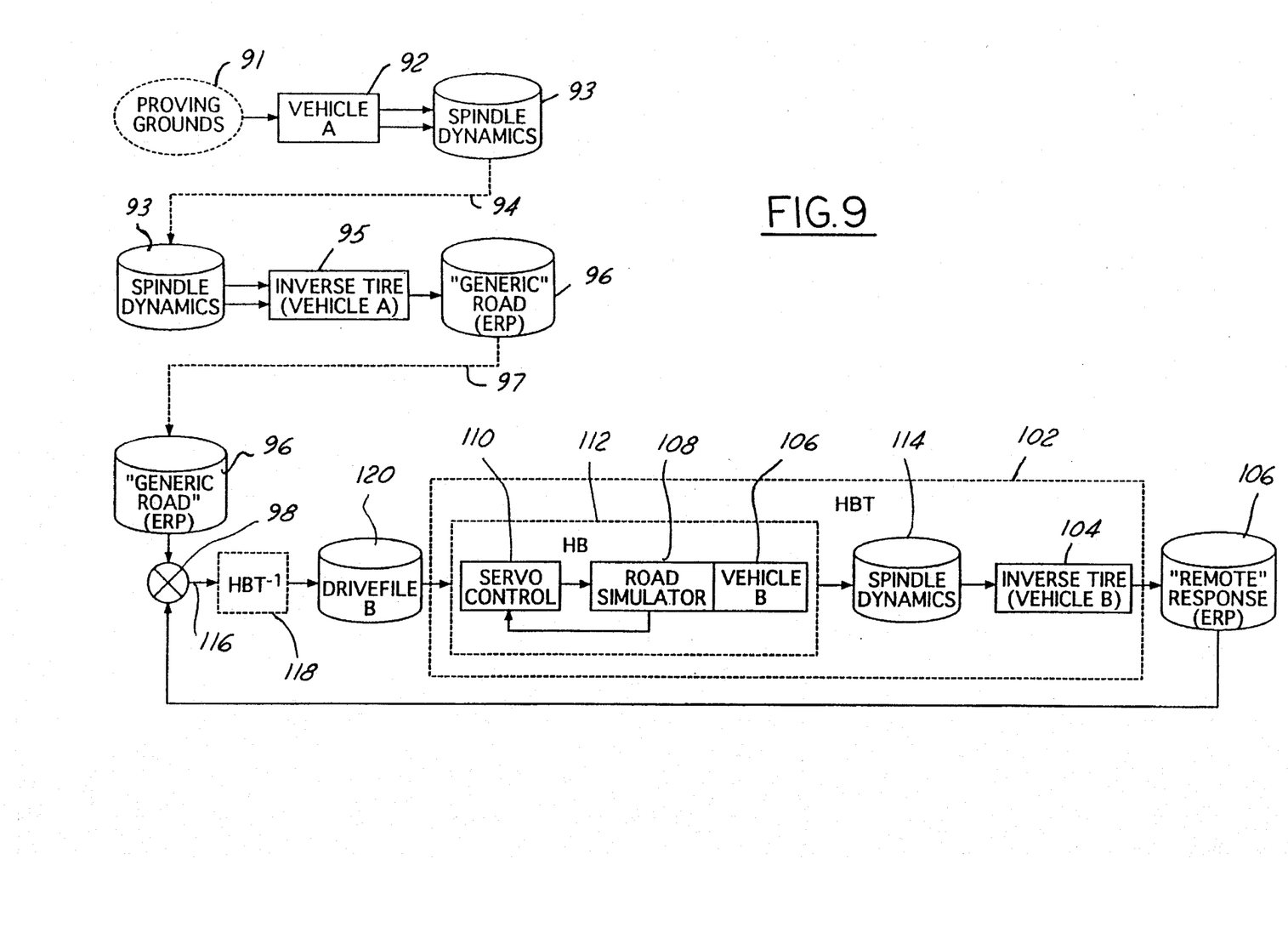
FIG. 9 is a schematic flow diagram of a preferred embodiment of the effective road profile control method for a spindle-coupled simulator according the present invention.

Turning now to FIG. 9, a more detailed flow diagram of a preferred embodiment of the effective road profile control method for a spindle-coupled simulator of the present invention is shown. Beginning at the top left of FIG. 9, a proving grounds facility 91 has a test road over which a vehicle A, indicated by box 92, is driven. Spindle dynamics data from the vehicle A is collected and is represented at cylinder 93, the data including spindle force and spindle acceleration as previously discussed. Typically, a vehicle has four spindles and spindle dynamics data is collected from each spindle. The data may be collected using force and acceleration transducers, or from other data collection devices known to those skilled in the art.

The collected dynamics data is then taken to a test facility or laboratory, as indicated by the dotted line 94, where it is used in conjunction with an inverse of a tire model, indicated at 95, to estimate a generic effective road profile, indicated at 96. The inverse tire model 95 is based upon a tire model of a tire used on vehicle A when driven over the test road. Those skilled in the art will recognize that the steps previously described are accomplished for each spindle and tire of the vehicle A, and that a single tire model for vehicle A may be used for each spindle.

The tire model, discussed in more detail below, can be represented as a transfer function developed from a set of linear differential equations which represent a physical tire. The model must be invertible, that is, have an inverse as that term is known by those skilled in the systems dynamics and control arts. The inverse of the tire model is needed for use with the spindle dynamics data since it is the tire input which must be predicted, although the tire model was developed to produce the spindle response to a known input.

Still referring to FIG. 9, the effective road profile 96 is used in a feedback control loop as indicated by line 97. The feedback control loop includes a summer 98 at which signals from the effective road profile 96 are compared to an output, referred to as "remote" response and indicated generally at 100. The remote response 100 is an output from a spindle-coupled road simulator transfer function HBT, indicated generally at 102, which includes an inverse of a tire model 104 of a tire on a second, or sample, vehicle B, indicated at 106. Development of the tire model for a tire of vehicle B is accomplished similarly to that for the tire of vehicle A, as described below. It should be understood that development of the tire models, both for vehicle A and vehicle B, need not be done at any particular time or in any particular order but only that such models be available when required by other steps of the method of the present invention.

Vehicle B, which has a different configuration than that of vehicle A as described above with reference to FIG. 7, is coupled to a spindle-coupled road simulator 108. A servo-controller 110, such an a conventional servo-control apparatus, is used for control of the road simulator (FIG. 9). System modeling of the vehicle B, the road simulator 108, and the servo-control 110, collectively comprise a transfer function HB, indicated generally at 112. Spindle dynamics data for vehicle B, indicated at cylinder 114, are generated from the road simulator 108 with vehicle B attached thereto. The spindle dynamics data 114 is then used in conjunction with the inverse tire model 104 for vehicle B to yield the remote response 100. The transfer function HB, the spindle dynamics 114, and the inverse tire model 104 collectively comprise the transfer function HBT.

As previously discussed, a sum between the generic effective road profile and the remote response 100 is calculated at 116 and is operated on by an inverse transfer function $HBT^{-1}$, indicated generally at 118, before being written to a drive file B indicated generally at cylinder 120. The set of control signals thus generated in the drive file B represents a unique control input for a particular simulator-vehicle-controller combination. The vehicle B can then be further tested while coupled to the spindle-coupled simulator without the need for driving it over the test road.

Figure 10:
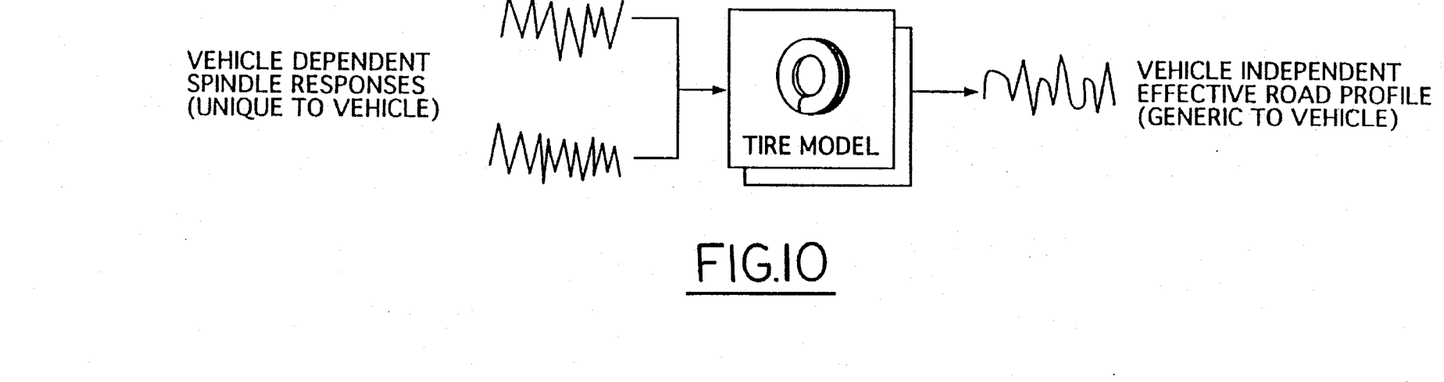
FIG. 10 shows development of an effective road profile generic to a vehicle from a set of unique vehicle dependent responses and a tire model.

Turning now to FIG. 10, it is seen that a tire model transforms vehicle dependent spindle responses, which are unique to a particular vehicle, into an effective road profile, which is vehicle independent. Various tire models could be used to simulate the tire providing that the particular model used has an inverse. Simple tire models typically assume that the tire envelopes an obstacle and the effect the tire tread has on contact and deformation is negligible. A net spindle force is generated by summing individual spring forces in the vertical and horizontal direction. For example, a radial spring model envelopes the terrain with springs that are radially attached to the center of a tire.

Ring elastic foundation models represent the tire as an the elastic foundation supporting a tread. These models are represented either with partial differential equations or with finite elements. This model requires fewer degrees-of-freedom than other finite element models to produce accurate results.

Detailed tire models are three dimensional finite element representations of a complete tire. These models are more representative of an actual tire and therefore, predict loads more accurately.

Regardless of the level of detail, all of the finite-element model forms discussed above are time-intensive to build and run and require an understanding of the tire material properties. If such requirements are met, the previously discussed models must be invertible, or so constructed to provide the requisite bridge between vehicle dependent spindle responses and an effective road profile. Preferably, however, a tire model which is easily derivable from readily measurable parameters, and which is easily implemented with the spindle-coupled simulator controller is desirable.

To develop such a tire model, system identification methods are preferably used to identify dynamic properties of a vehicle tire to be modeled. The system identification modeling approach requires experimental input/output test data which allows the dynamics of a system to be observed, and aids in the selection of an appropriate model form. Alternatively, a model form can be assumed, based upon an understanding of the known physical characteristics of the system. Once a model form for the system is selected, the model parameters (e.g., coefficients of the selected differential equations) can be identified based upon a system identification method (such as least squares estimation) that minimizes the output error between the physical system and modeled system for a given input.

Figure 11A:
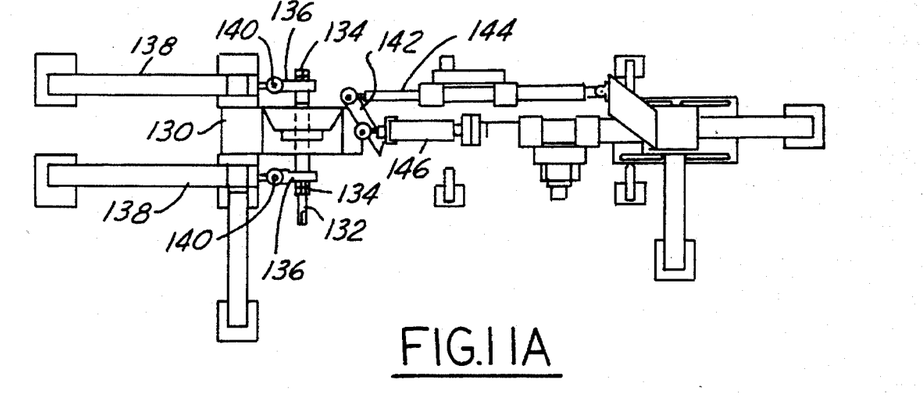
FIGS. 11A and 11B show, respectively, a top view and a side view of a tire test stand for development of a tire model for use in accordance with the method of the present invention.
Figure 11B:
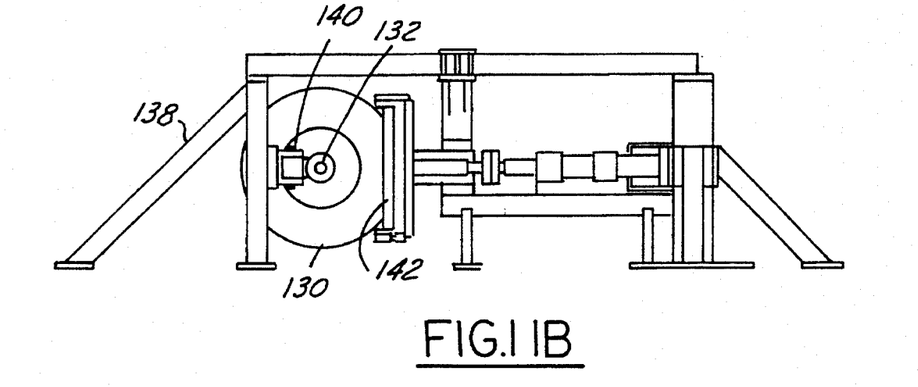
Figure 12A:
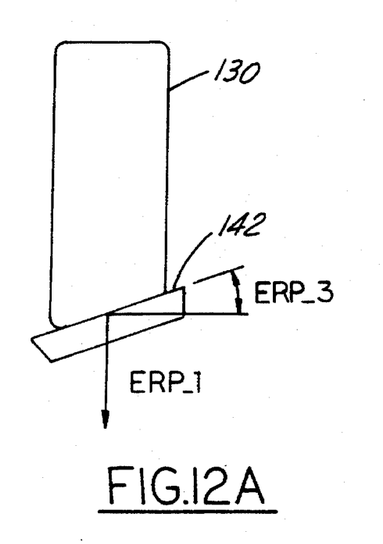
FIGS. 12A and 12B, respectively, show a front view and side view of a tire on a flat tire contact plane of a tire test stand which varies in radial displacement, radial contact angle, and lateral contact angle.
Figure 12B:
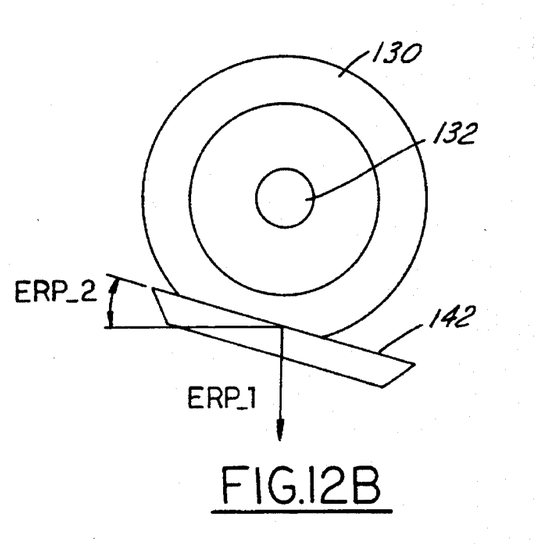

This input/output test data is obtained through use of a tire test stand such as that seen in FIGS. 11A and 11B. The tire test stand has a three point, fixed reacted load frame with a shaft connected thereto supported by zero-lash tapered roller bearings to prevent tire wind-up. A wheelpan is used to provide excitation to the tire and serves as a flat contact plane which varies in radial displacement, radial contact angle, and lateral contact angle (FIGS. 12A and 12B). The system identification technique thus uses the tire contact plane, or wheelpan, as a coordinate system in which to develop a set of dynamically varying data including radial deflection, radial contact angle, and lateral contact angle of a tire to be modeled.

Referring again to FIGS. 11A and 11B, a tire test stand for use in developing a tire model for a vehicle to be coupled to the spindle-coupled simulator is shown. A tire 130 is mounted on a spindle 132 which is journalled in spindle support bearings 134 on opposite sides of the tire 130. A set of supports 136 attach the spindle to a tire support structure 138. A pair of double axis, support force transducers 140 are mounted on the tire supports 136 for collecting spindle dynamics data. The tire 130 is in contact with a tire contact plane 142, modeled as a flat surface road plane. Lateral contact angle input is provided through a piston 144 connected to the tire contact plane 142, the piston 144 preferably being hydraulically actuated. Radial deflection is provided by a piston 146, also connected to the tire contact plane 142. The piston 146 is also preferably hydraulically actuated.

The tire test stand includes measurement transducers for measuring wheelpan displacement, wheelpan force and acceleration, tire patch to wheelpan displacement, and spindle force. Additionally, a displacement transducer, preferably a laser displacement transducer, can be mounted in the wheelpan to track the tire patch trajectory in order to develop a loss of contact profile.

The tire test stand has a hydraulic actuator with a capacity in the range of 15 KIPS, a 3 inch displacement, and a three stage servo-valve with a flow rate of approximately 90 gallons per minute. The actuator/valve peak velocity is in the range of 100 to 150 inches per second. Resonance frequencies for the tire test stand are preferably higher than the spindle-coupled simulator controller bandwith. Example frequencies for the tire test stand are 70 to 100 hertz for the wheelpan lateral mode, and 80 to 100 hertz for the wheelpan vertical mode. Those skilled in the art will recognize that tire test stand system capacities, displacements, and valve flow rates and peak velocities can vary according to application and that the values given are by way of example and not by way of limitation.

Turning again to FIGS. 12A and 12B, a coordinate system is selected to represent the road surface so as to make it generic from a testing standpoint while also allowing it to be physically introduced using an experimental test system. As such, a "flat surface road plane" coordinate system is defined to satisfy both of those requirements. The flat surface road plane coordinate system is defined in three coordinates: a plane vertical deflection at the tire path center (ERP_1), a plane radial contact angle with the tire (ERP_2), and a plane lateral contact angle with the tire (ERP_3). Loads which affect the structural durability of vehicles can thus be reproduced at the test tire by achieving a correct spindle force and acceleration in the vertical and longitudinal axes of a tire, in addition to a correct spindle force-moment relationship in the lateral axis of a tire. Experimental data for use with the tire model system identification technique is therefore obtained in the form of spindle force and acceleration, and spindle force-moment, collectively referred to as the outputs, as well as the input tire plane vertical deflection, plane radial contact angle, and plane lateral contact angle.

Figure 13:
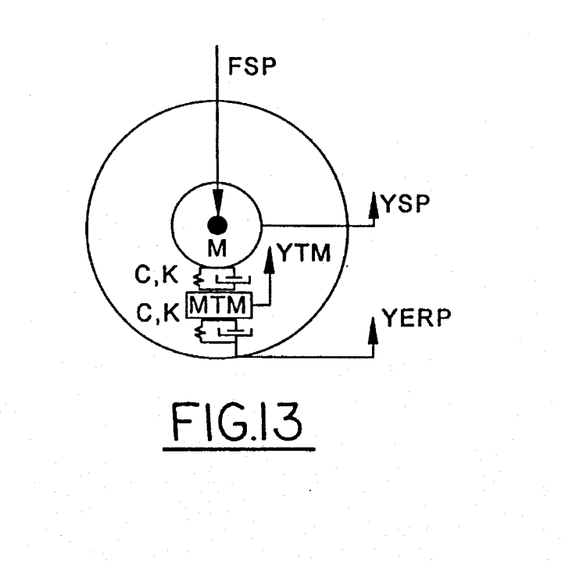
FIGS. 13 and 14 show, respectively, a tire freebody force and parameter model and a tire model diagram.
Figure 14:
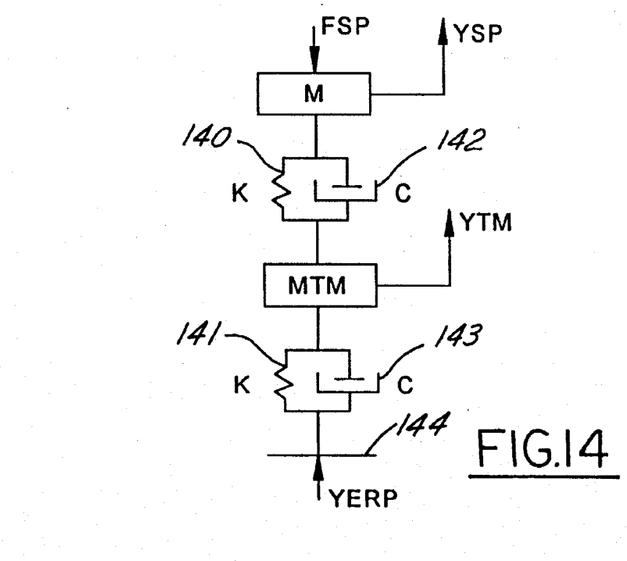

A system model can be derived using physical principles and observed experimental behavior, as shown in FIGS. 13 and 14. In FIG. 13, a free body force diagram is shown for a tire. Discussion of the tire model is best understood with reference to FIG. 14, and expanded tire diagram. A spindle force, FSP, acts on the spindle-coupled tire net mass, M, which is derived from physical principles, at the tire spindle, indicated at 130 in FIG. 13. A non-physical modal tire model matches experimental observation and is represented as modal mass MTM with a first spring 140 mounted between the net mass M and the modal mass MTM, and also having a spring 141 between the modal mass MTM and the wheelpan 144. Both springs 140, 141 have a spring stiffness constant K. Likewise, a damper 142 is modeled in parallel with the spring 140 between the tire modal mass MTM and the net mass M, and a damper 143 is in parallel with the spring 141 between the tire modal mass MTM and the wheelpan 144. Both dampers 142, 143 have a damping constant of C. Displacement parameters of the spindle, YSP, the modal tire, YTM, and an effective road profile, YERP, are shown in FIG. 10.

A Laplace transfer function representing the tire system model is:

$$M_{tm}s^2\ F(s)+2Cs\ F(s)+2K\ F(s)=C^2s^2\ Y(s)+2CKs\ Y(s)+K^2\ Y(s)$$

where s is a complex variable used in the Laplace transform to reduce differential equation representations of dynamical systems to simple algebraic form. This transfer function can be converted from the continuous Laplace s-domain form to the discrete difference equation z-domain form for use with computational methods, as on a computer, by substitution using the backward-difference relationship:

$$s=(1-z^{-1})/T$$

where T is the discrete computational time interval.

This transfer function can be converted to difference equations by using the backward difference relationship for s, as defined above, to convert from a continuous to a discrete form for use with computational methods, as on a computer. As those skilled in the art will recognize, many techniques are available to then estimate the parameters of the resulting linear system model. A preferable method is a least squares algorithm.

Figure 15:
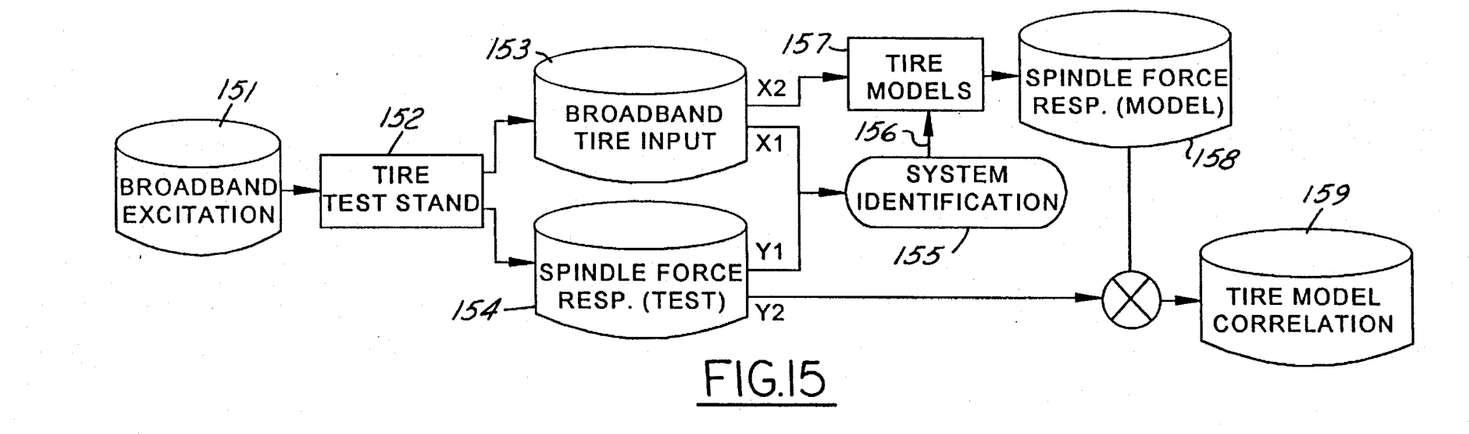
FIG. 15 is a schematic flow diagram showing development of a tire model through use of a system identification technique for use with the effective road profile control method according to the present invention.

Referring now to FIG. 15, a flow diagram for a system identification technique used to identify the dynamic properties of a test tire is shown. A broadband excitation 151 of the tire test stand 152 is required to accurately determine tire dynamic properties. In order to excite the tire over its full dynamic range without damage, the proper input excitation range must first be established. To establish this input excitation range, a tire is first mounted in the test stand and a static tire deflection necessary to achieve ¼ of the vehicle weight is determined. Next, a maximum deflection amplitude is determined by moving the wheelpan into the tire until a predetermined maximum spindle force is achieved at a specific tire pressure. These ranges are used to determine maximum displacement which will be used to achieve desired force levels based on static load and deflection conditions.

Once the maximum deflection amplitude is determined, the tire test stand system is excited by a servo hydraulic actuator, which is computer controlled, to identify steady state behavior of the tire. Preferably, a frequency between 0 and 300 hertz of random white noise is used having an amplitude with a weighting function of the inverse of a square of the frequency. To avoid exceeding static tire deflection, the mean-centered white noise is preferably passed through a quadratic transformation. This allows the input displacement to reach desired levels while simultaneously insuring that tire patch compressive forces are maintained within the static and dynamic limits.

Since tire temperature has a significant effect on its apparent pressure, it is preferable to excite the tire with a small amplitude input, for example approximately a 1 inch signal, for a given time, for example, approximately 20 minutes, prior to exciting the tire on the test stand and taking the requisite measurements. Such a step allow tire pressure to stabilize thereby providing more accurate measurements.

Referring again to FIG. 15, broadband tire input signals 153 and spindle force response signals 154 are collected during the broadband excitation 151 of the tire test stand 152. Both broadband tire input X1 and spindle force response Y1 are then input to the system identification 155. The system identification 155 is a least squares parameter estimation to minimize the model output error against measured output for the model selected. Parameter 156 determinations, such as the spring stiffness constant K and the damping constant C, are subsequently output from the system identification 155 to the tire model 157. The tire model 157 also receives broadband tire input X2 and calculates a spindle force response 158 based upon the tire model. The model spindle force response 158 is then compared to the actual spindle force response Y2 from the test stand to provide tire model correlation 159.

Figure 16A:
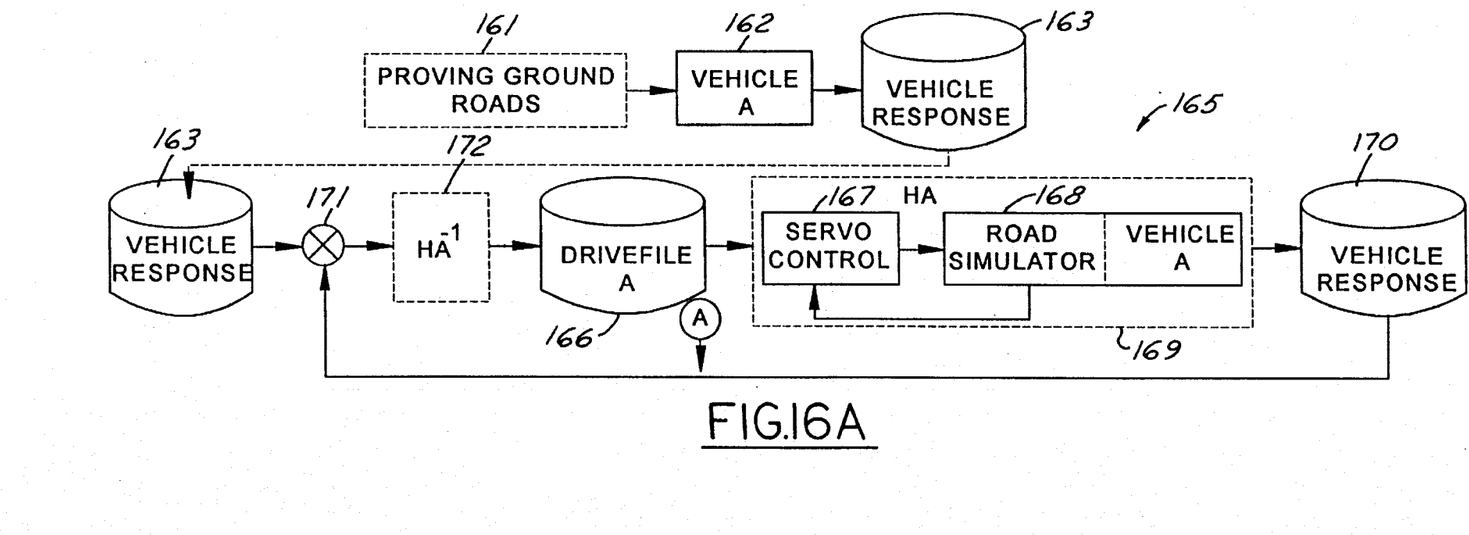
FIGS. 16A and 16B are schematic flow diagrams showing a first alternative embodiment of the effective road profile control method for a spindle-coupled road simulator according to the present invention.
Figure 16B:
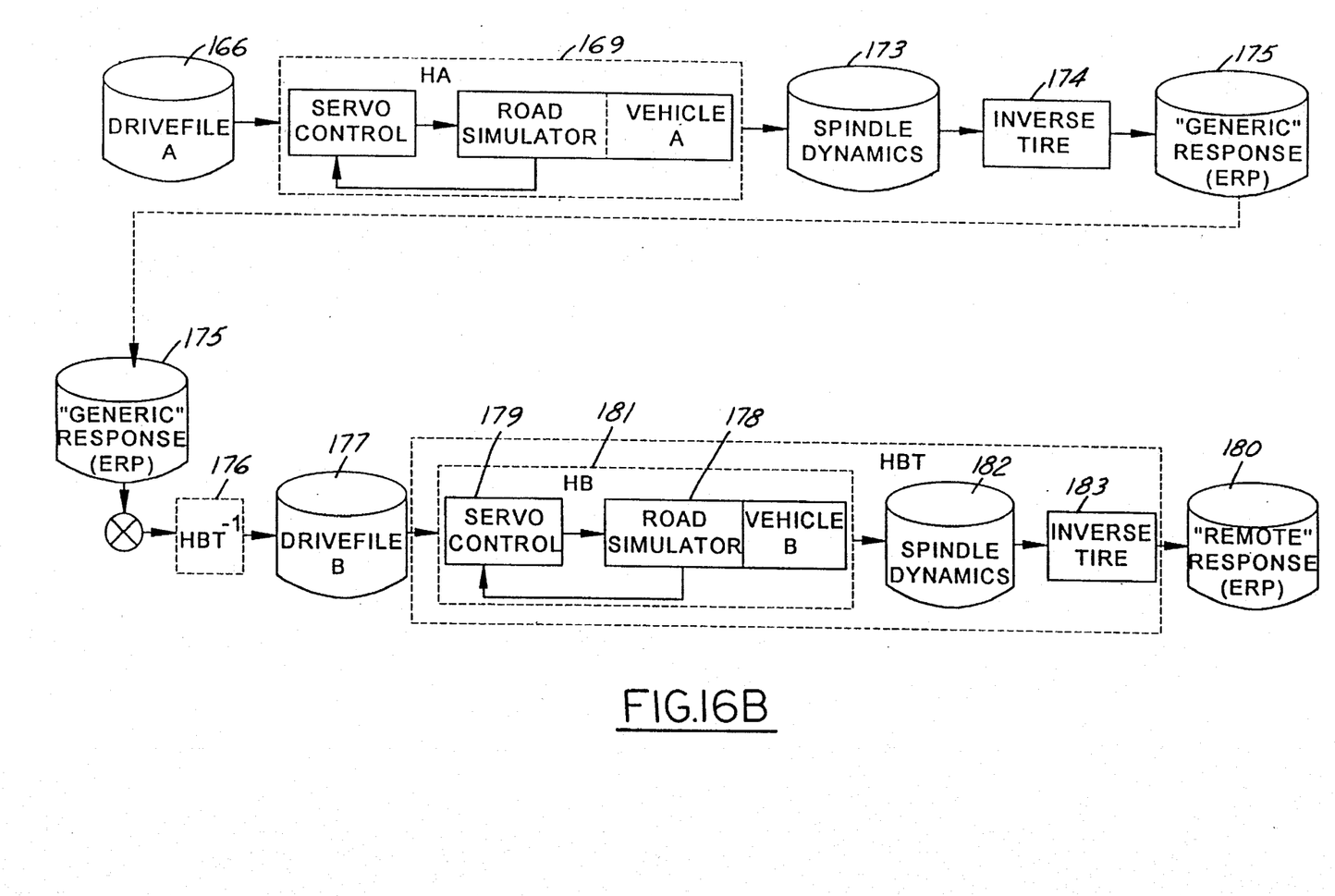

If spindle response data, such as spindle acceleration and spindle force, are not directly obtainable when driving a vehicle over a test road, other vehicle response data can be recorded and used to derive spindle responses through an intermediate process, as shown in FIGS. 16A and 16B. This intermediate process may be necessary when time and expense constraints prevent direct collection of the spindle dynamics data. For example, instrumentation of a test vehicle to obtain the spindle dynamics data may require time consuming vehicle disassembly and assembly to properly locate the appropriate transducers on or near the vehicle spindles. Beginning at the top leer of FIG. 16A, a proving grounds facility 161 has a test road over which a vehicle A, indicated at box 162, is driven. The vehicle response data which, for example can be force and acceleration data from a component on the vehicle in the vicinity of the spindle, such as the chassis, is collected, as represented at cylinder 163. Preferably, such data is collected in the vicinity of each of a vehicle's four tires. As previously discussed, such data may be collected using force and acceleration transducers or other data collection devices known in the art.

The vehicle response data is then taken to a test facility or laboratory, as indicated by the dotted line 164, to derive spindle dynamics data, and ultimately an effective road profile. As a first step in that direction, the vehicle response data 163 is used in a feedback control loop, generally indicated at 165 to produce a drivefile A, indicated at cylinder 166, which is used to drive a spindle-coupled road simulator with Vehicle A, which is the vehicle driven over the test road at the proving grounds, coupled thereto. A servo-controller 167, such as a conventional servo-control apparatus is used for control of the road simulator (FIG. 16A). System modeling of the vehicle A, the road simulator 168, and the servo-control apparatus 167, collectively comprises a transfer function HA, indicated generally at 169. A "simulated" response, indicated generally at 170, is produced as a result of the road simulator and is compared at summer 171 to the vehicle response 163. The resulting difference between the vehicle response 163 and the simulated response 170 is used as a control signal after being operated on by an inverse transfer function $HA^{-1}$, indicated generally at 172.

Continuing with FIG. 16B, the data developed for the drivefile A, at cylinder 166, is then used as an input to the spindle-coupled simulator and the transfer function 169 in order to collect spindle dynamics data, indicated at cylinder 173, which includes spindle force and spindle acceleration. This spindle dynamics data is then used in conjunction with an inverse of a tire model for vehicle A, indicated at 174, to estimate a generic effective road profile indicated at cylinder 175. As described above, the inverse tire model 174 is based on a tire model of a tire used on vehicle A when driven over the test road. Once a generic effective road profile has been developed, it can be used as described above with reference to FIG. 9. Briefly, a difference between the effective road profile 175 and a "remote" vehicle response 180 is calculated and operated on by an inverse transverse function $HBT^{-1}$, indicated generally at 176, before being written to a drivefile B, indicated generally at cylinder 177. Vehicle B, which has a different configuration than that of vehicle A, is coupled to the spindle-coupled road simulator 178. A servo-controller 179 is used for control of the road simulator 178. System modeling of the vehicle B, the road simulator 178, and the servo-controller, indicated generally at 179, collectively comprise a transfer function HB, indicated at 181. Spindle dynamics data for vehicle B, indicated at cylinder 182, are generated from the road simulator 178 with vehicle B attached thereto. The spindle dynamics data 182 is then used in conjunction with the inverse tire model, indicated at 183, to yield the remote vehicle response 180. Vehicle B can thus be tested, and road forces simulated, without having to drive the vehicle B over a test road.

Figure 17:
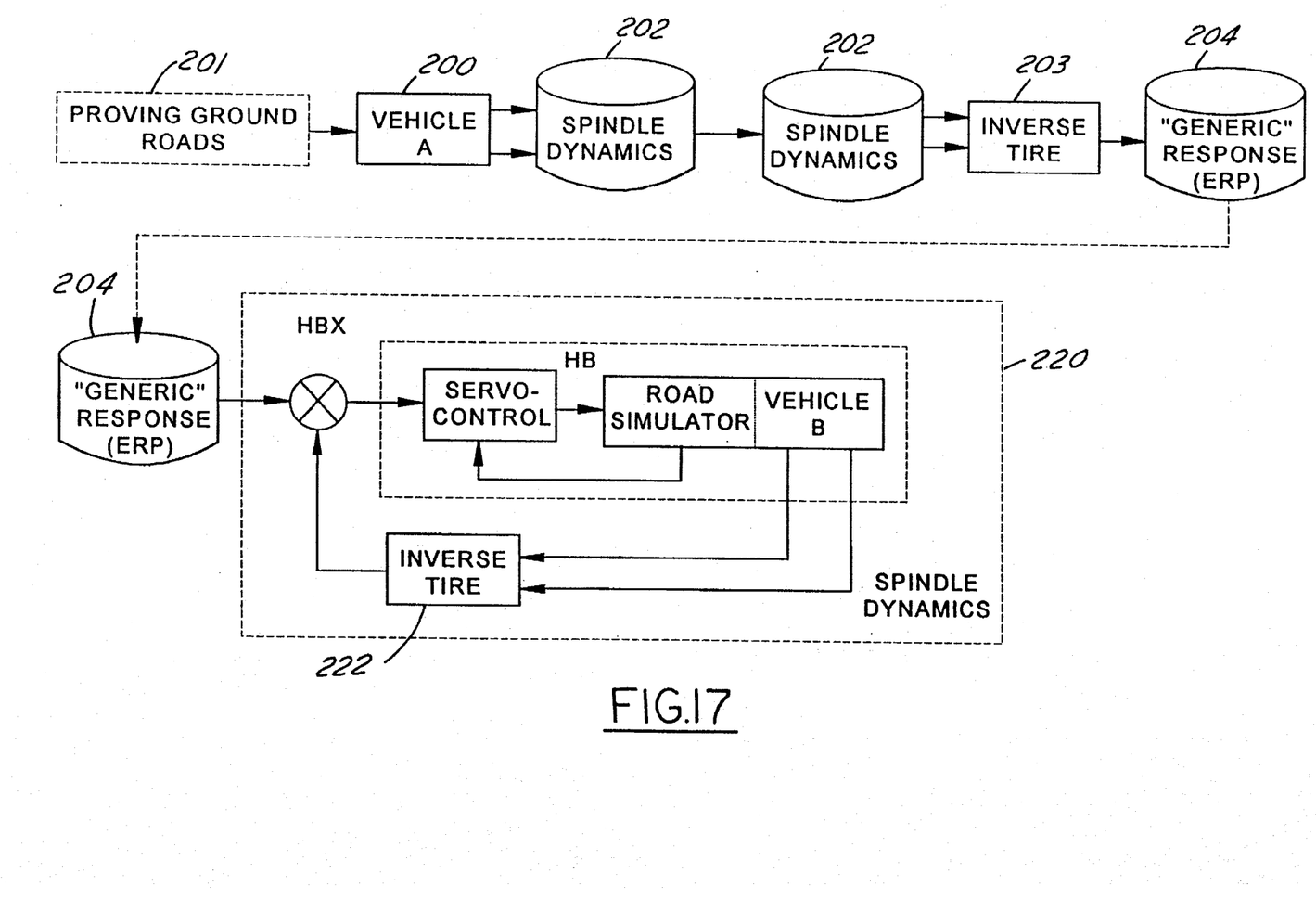
FIG. 17 is a schematic flow diagram showing a second alternative embodiment of an effective road profile control method for a spindle-coupled simulator according to the present invention.

Turning now to FIG. 17, a second alternative embodiment for the present invention is shown. As with the previously described embodiments, a vehicle A, indicated at 200, is driven over a test road at proving ground facilities, indicated at 201. Spindle dynamics data at 202 is collected and used with an inverse tire model, indicated at 203, to develop a generic effective road profile 204. Unlike the previously discussed embodiments, however, the effective road profile 204 is input directly to a controller of a spindle-coupled simulator, indicated generally at 220. The controller 220 has an inverse tire model 222, for a tire of vehicle B, embedded directly into the controller 220. Such a configuration allows the effective road profile to be used directly as a control signal for the controller 220, thus eliminating certain computational steps required by the previously described embodiments when vehicle B is coupled to the spindle-coupled simulator (see FIGS. 9 and 16).

Figure 18:
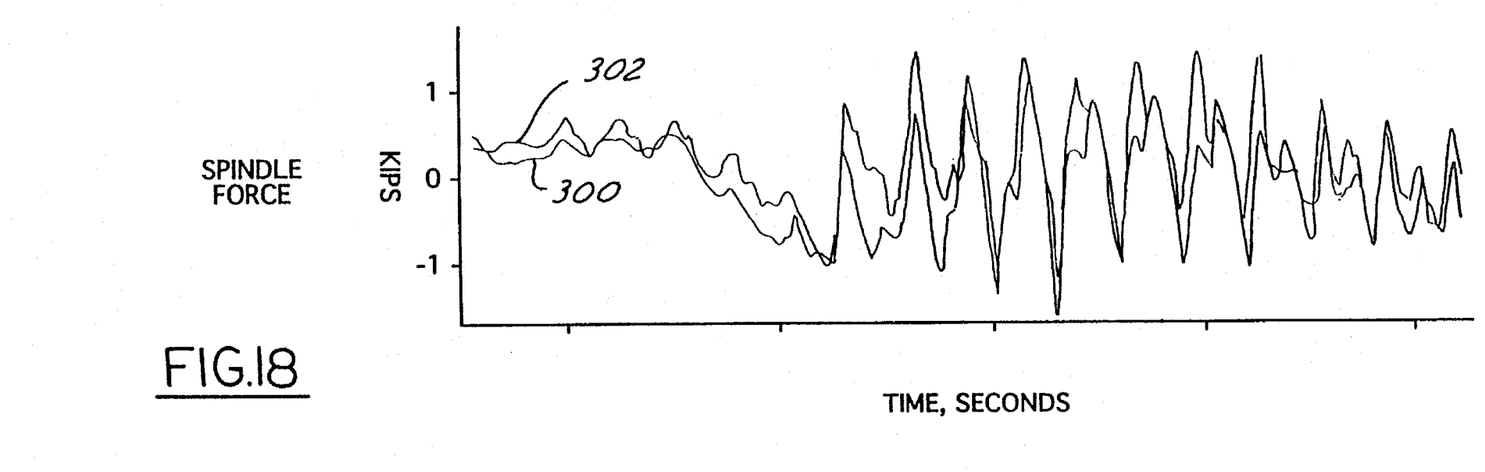
FIG. 18 is a graph showing variations in spindle force developed for a vehicle having two configurations when simulated on a spindle-coupled simulator with an effective road profile process according to the present invention.
Figure 19:
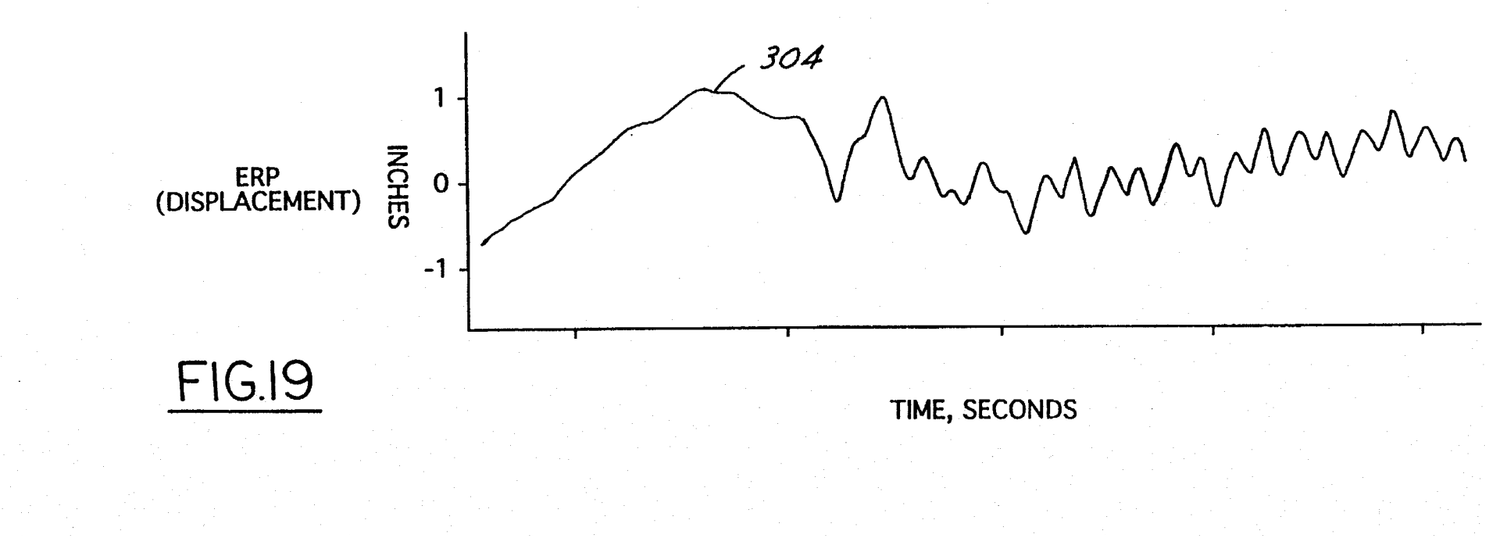
FIG. 19 is a graph showing the effective road profiles developed from the spindle force histories shown in FIG. 18.

Spindle force histories 300 and 302 for two separate vehicle configurations, such as vehicle A and vehicle B, when driven over a test road are shown in FIG. 18. As described above with respect to FIGS. 5 and 6, such spindle force histories cannot accurately be interchangeably used in a spindle-coupled vehicle simulator. However, an effective road profile 304, as seen in FIG. 19, can be used with a spindle-coupled simulator as a controller input when either vehicle A or B is coupled to the simulator.

Although the preferred embodiments of the present invention have been disclosed, various changes and modifications may be made thereto by one skilled in the art without departing from the scope and spirit of the invention as set forth in the appended claims.

We claim:

1. A method for controlling an automotive vehicle spindle-coupled road simulator comprising the steps of:
   (a) driving a first vehicle over a road surface;
   (b) collecting spindle dynamics data from at least one spindle of said first vehicle;
   (c) developing a first tire model for said first vehicle;
   (d) estimating a road profile for said road surface based upon said spindle dynamics data and said first tire model;
   (e) developing a second tire model for a second vehicle;
   (f) coupling said second vehicle to said spindle-coupled simulator; and
   (g) generating a set of control signals for driving said spindle-coupled simulator with said second vehicle coupled thereto so that a road response generated by said spindle-coupled simulator is consistent with said road profile.

2. The method according to claim 1 wherein said control signals of step (g) are generated in a feedback control loop having an input signal formed by the difference between said road profile and an output from said feedback control loop, said input signal input to a response simulation transfer function which includes an inverse of said second tire model.

3. The method according to claim 1 wherein said first and second tire models are developed using a system identification technique.

4. The method according to claim 3 wherein said system identification technique includes a coordinate system for said road profile defined as a flat tire contact plane which varies in radial displacement, radial contact angle, and lateral contact angle.

5. The method according to claim 4 wherein a programmable tire test stand is used to develop a set of dynamically varying data, including radial deflection, radial contact angle, and lateral contact angle of a tire to be modeled with respect to said coordinate system, for input to said system identification technique.

6. A method for testing a sample vehicle on an automotive vehicle spindle-coupled road simulator without driving the sample vehicle over a test road, the method comprising the steps of:
   (a) driving a test vehicle over a test road surface;
   (b) measuring test road response parameters from the test vehicle while driving the test vehicle over the test road surface;
   (c) coupling the test vehicle to the spindle-coupled simulator;
   (d) generating test control signals for driving the spindle-coupled simulator with the test vehicle coupled thereto so that a set of simulator road response parameters output from the spindle-coupled simulator matches the test road response parameters;
   (e) developing a first tire model for the test vehicle;
   (f) estimating an effective road profile for the test road surface based upon the test control signals and the first tire model;
   (g) developing a second tire model for the sample vehicle;
   (h) coupling the sample vehicle to the spindle-coupled simulator; and
   (i) generating sample control signals for driving the spindle-coupled simulator with the sample vehicle coupled thereto so that a road response generated by the spindle-coupled simulator is consistent with the effective road profile.

7. The method according to claim 6 wherein the test control signals in step (d) are generated in a first feedback control loop having an input signal formed by the difference between the test road response parameters and an output from the feedback control loop, the input signal being input to a test response simulation transfer function which includes a model of the test vehicle.

8. The method according to claim 7 wherein in step (d) the test control signals are input to the spindle-coupled simulator with the test vehicle coupled thereto to produce a set of spindle response parameters, the spindle response parameters used with an inverse of the first tire model in step (f) to estimate the effective road profile.

9. The method according to claim 6 wherein the sample control signals in step (i) are generated in a second feedback control loop having an input signal formed by the difference between the effective road profile and an output from the feedback control loop, the input signal being input to a second response simulation transfer function which includes an inverse of the second tire model.

10. The method according to claim 6 wherein the first and second tire models are developed using a system identification technique.

11. The method according to claim 10 wherein the system identification technique includes a coordinate system for said road profile defined as a flat tire contact plane which varies in radial displacement, radial contact angle, and lateral contact angle.

12. The method according to claim 11 wherein a programmable tire test stand is used to develop a set of dynamically varying data, including radial deflection, radial contact angle, and lateral contact angle of a tire to be modeled with respect to said coordinate system, for input to said system identification technique.

13. A method for controlling an automotive vehicle spindle-coupled road simulator comprising the steps of:

(a) driving a first vehicle over a road surface;

(b) collecting spindle dynamics data from at least one spindle of the first vehicle;

(c) developing a first tire model for the first vehicle;

(d) estimating a an effective road profile for the road surface based upon the spindle dynamics data and the first tire model;

(e) developing a second tire model for a second vehicle;

(f) coupling the second vehicle to the spindle-coupled simulator; and (g) using the effective road profile as a test control signal for driving the spindle-coupled simulator with the vehicle coupled thereto by forcing a road response generated by the spindle-coupled simulator to be consistent with the effective road profile.

14. The method according to claim 13 wherein an inverse of the second tire model is imbedded directly into a controller of the spindle-coupled simulator to allow the effective road profile to be used directly as a test control signal for the simulator.

15. The method according to claim 14 wherein the tire model is developed using a system identification technique.

16. The method according to claim 15 wherein said system identification technique includes a coordinate system for said road profile defined as a flat tire contact plane which varies in radial displacement, radial contact angle, and lateral contact angle.

17. The method according to claim 16 wherein a programmable tire test stand is used to develop a set of dynamically varying data, including radial deflection, radial contact angle, and lateral contact angle of a tire to be modeled with respect to said coordinate system, for input to said system identification technique.

18. The method according to claim 13 wherein the first and second tire models is developed using a ring elastic foundation tire model.

19. The method according to claim 13 wherein the first and second tire models is developed using finite element representations of a complete tire.

* * * * *